Feb. 20, 1951 M. H. C. WELLS 2,542,102
AIRFIELD APPROACH INSTRUMENT FOR USE IN AIRCRAFT
Filed Feb. 27, 1947 2 Sheets-Sheet 1

INVENTOR
MARJORIE HENDRY CAMERON WELLS
BY Otto Munk
HER ATTY

Feb. 20, 1951 M. H. C. WELLS 2,542,102
AIRFIELD APPROACH INSTRUMENT FOR USE IN AIRCRAFT
Filed Feb. 27, 1947 2 Sheets-Sheet 2

INVENTOR
MARJORIE HENDRY CAMERON WELLS
BY Otto Munk
HER ATTY

Patented Feb. 20, 1951

2,542,102

UNITED STATES PATENT OFFICE 2,542,102

AIRFIELD APPROACH INSTRUMENT FOR USE IN AIRCRAFT

Marjorie Hendry Cameron Wells,
London, England

Application February 27, 1947, Serial No. 732,330
In Great Britain March 8, 1946

2 Claims. (Cl. 177—352)

This invention relates to airfield approach instruments for use on aircraft.

Known instruments for this purpose are provided with a coloured panel below the dial of which the halves are coloured yellow on the right hand portion and blue on the left hand portion over which moves a needle which is hinged at the top of the dial. When the indicator needle is over the blue portion a pilot must turn left, whilst when it is over the yellow portion the pilot must turn right.

This arrangement is liable to confuse a pilot as according to the position of the needle this may give him the impression that he must turn in the same direction as the needle is pointing instead of in the opposite direction. This is a serious disadvantage and may lead to accidents, perhaps fatal accidents, particularly in the case of flying solely by instruments.

Further in known instruments a glide path needle is pivoted at the side of the instrument and when an aircraft is following a pre-set glide path, which is usually represented on the dial by a horizontal dotted datum line extending across the centre of the dial, the glide path needle corresponds with this dotted line. When the aircraft drops below the predetermined glide path the needle rises above the datum line, whilst when the aircraft rises above the predetermined glide path the needle falls below the datum line. The glide path needle therefore also indicates the reverse of the movement of the aircraft.

The object of the present invention is to provide an animated diagrammatic representation of a factual approach of an aircraft to an airfield in which the actual movements of the aircraft in relation to the guiding beams and the airfield are faithfully portrayed.

According to the present invention an airfield approach instrument is provided with a curved dial of which the convex surface is at the front of the instrument so as to be opposite an observer, the right hand half of the dial being marked and/or coloured conventionally so as to represent an area to the right of a line of flight, and the left hand half of the dial being marked and/or coloured conventionally so as to represent an area to the left of the line of flight, whilst a directional approach needle is hinged at its lower end centrally opposite the bottom of the dial, and a glide path needle is hinged at the centre of curvature of the dial or otherwise supported and is provided at its free end with a horizontal bar for movement up and down in front of the dial.

Between the marked and/or coloured areas may be provided a line or strip simulating a landing beam.

The glide path needle is preferably hinged at its rear end laterally of the dial and at its forward end is bent at right angles so as to extend horizontally across the whole of the dial and preferably carries a model of a runway in perspective preferably centrally on and above the needle.

The directional approach path needle is preferably of such length as to extend halfway up the dial and preferably has a miniature aeroplane attached to its free end.

The invention will now be described by way of example with reference to the accompanying drawings, wherein—

Figure 1:
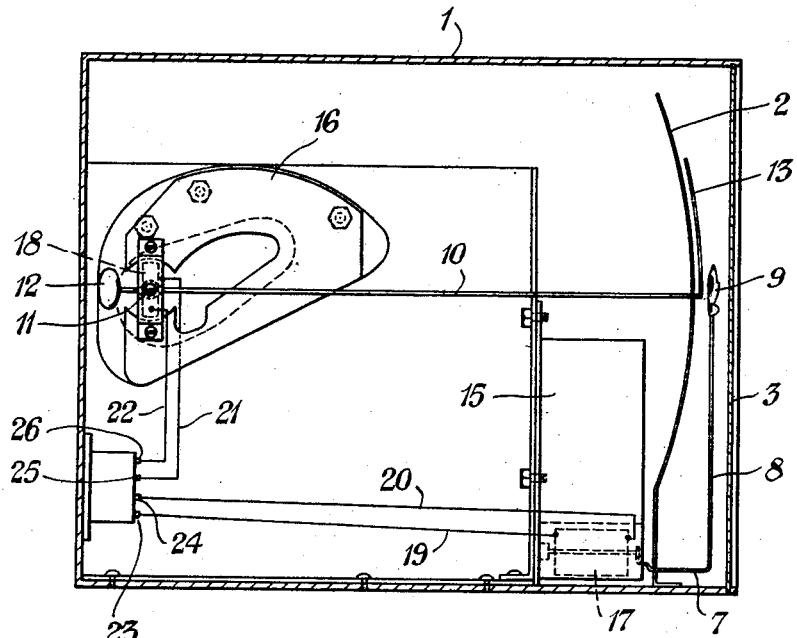
Fig. 1 is a sectional side view of an airfield approach instrument.
Figure 2:
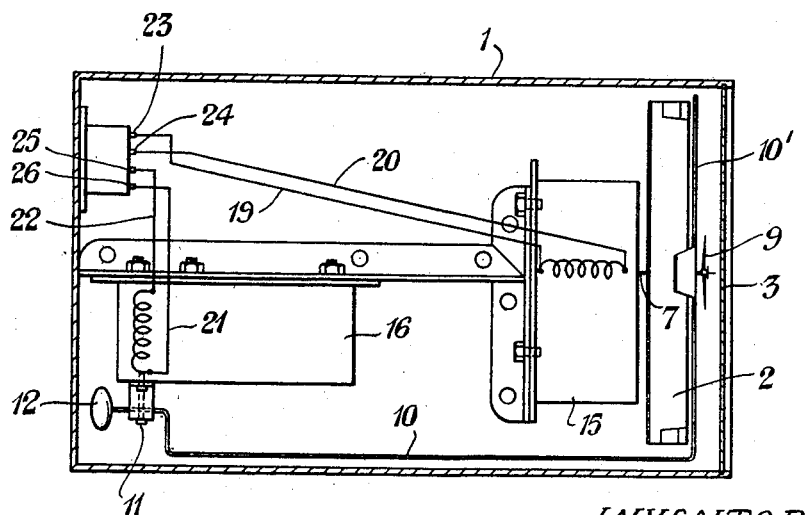
Fig. 2 is a sectional plan of Fig. 1.

An airfield approach instrument is provided with a casing 1 at the front end of which is mounted a curved dial 2 of which the convex side is directed forwardly. The front of the casing is closed by a transparent member 3.

On the convex surface of the dial 2 the right hand portion 4 (Figs. 3 to 6) is marked and/or coloured blue conventionally so as to represent an area to the right of a line of flight 5, whilst the left hand portion 6 is marked and/or coloured yellow conventionally so as to represent an area to the left of the line of flight 5.

Areas 4 and 6 are thus placed and coloured in correct relation to the conventionally coloured sectors of a ground installation.

The marked and/or coloured areas 4 and 6 have preferably arranged between them a line or strip 5 representing the correct line of flight relatively to the directing beam from the ground installation.

At the centre 7 or opposite the centre of the bottom of the dial 2 is pivotally mounted a suitably counter balanced directional approach path pointer or needle 8. This needle 8 extends upwardly over substantially half the length of the dial 2 and has a miniature aeroplane 9 secured thereto.

As a result of the movement of the pointer 8 a pilot thus receives an indication as to the divergence away from a datum line into a particular area, the angle of lateral deviation being indicated by the scale 40.

Figure 3:
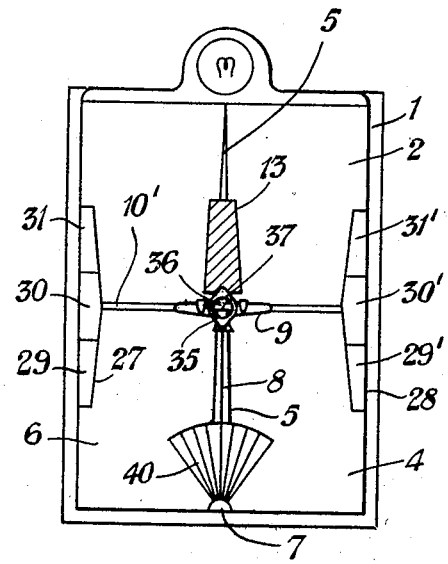
Figs 3, 4, 5 and 6, show front elevations of the instrument with pointers thereof in different positions.

A glide path needle or pointer 10 is pivotally mounted at the rear of the dial 2 at the centre of curvature 11 of the latter and preferably laterally of the dial 2 and is suitably counter-balanced by a weight 12. The forward end 10' of the needle 10 is bent at right angles so as to extend horizontally across the dial 2. The needle portion 10' thus appears as a horizontal line or artificial horizon moving vertically over the dial 2. The artificial horizon 10' then represents a horizon at a predetermined angle downwards from the horizontal, the datum point of which is approximately 50 yards along a particular airfield runway. When therefore, a miniature runway 13 is attached to the artificial horizontal 10', then when the approach path needle 8 and the glide path needle 10' are correctly aligned as shown in Fig. 3, the instrument presents a replica in miniature of an aircraft landing on a runway. In order that this position is clearly seen, the aircraft 9 is provided with an opening 35 through which can be seen the point of connection 36 between the reduced end 37 of the runway 13 and the artificial horizon 10'.

The instrument is controlled in the same way as existing airfield approach instruments, that is to say it is provided with galvanometers 15, 16 provided with oscillatory armatures 17, 18 to which the needles 8, and 10, 10' are secured respectively. The armatures 17, 18 are respectively connected by leads 19, 20 and 21, 22 to contact pins 23, 24, 25, 26. To the pins 23, 24, 25, 26 are connected the usual terminals of circuits influenced by the ground installation.

As shown in Figs. 3 to 6, the dial 2 is provided on each side with panels 27, 28 each having three areas 29, 30, 31, and 29', 30', 31' respectively. The areas 29, 29' are coloured yellow, the panels 30, 30', green, and the panels 31, 31' red. The areas 30, 30' extend slightly above and below the horizontal central plane of the dial 2 so as to indicate to the pilot, when the needle 10' is beside these areas that it is at the correct height of approach. When however, the needle 10' is beside the red areas 31, 31' it indicates that the aircraft is undershooting, whilst when it is beside the yellow areas 29, 29' it indicates that the aircraft is overshooting.

Fig. 3 indicates the position of the needles 8, 10' when the aircraft is approaching aligned with the pre-set glide path.

Figure 4:
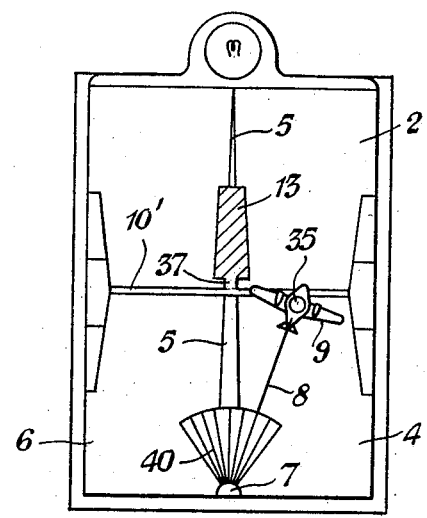

Fig. 4 shows the position of the needles 10', 8, when the aircraft is at correct approach height, but is deviating to the right of the approach track.

Figure 5:
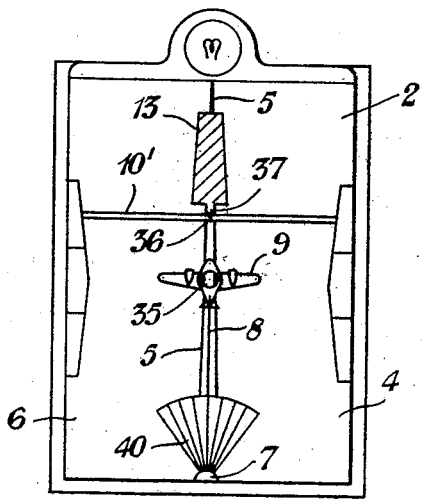
Figure 6:
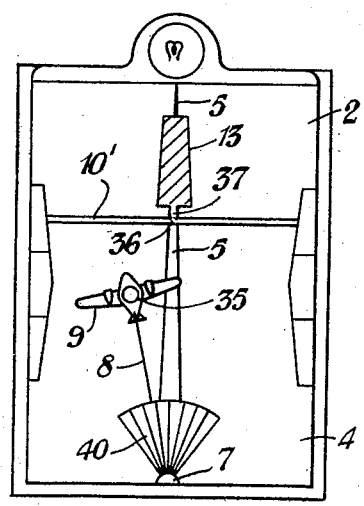

Fig. 5 shows the position of the needles 8, 10' when the aircraft is on the correct track but is undershooting, whilst Fig. 6 shows the position of the needles 8, 10 when the aircraft is to the left of the track and undershooting.

An instrument as above described gives at sight correct positioning of an aircraft relatively to landing beams and to the airfield so that the pilot can steer his aircraft directly in accordance with the replica presented by the instrument and there is no necessity of taking reverse action to what is shown as is the case with existing instruments. In this manner the disadvantages of existing instruments are eliminated.

What I claim as my invention and desire to secure by Letters Patent is:

1. An airfield approach instrument comprising a casing, a transparent member in one end of said casing, a curved dial mounted inside said casing adjacent said transparent member, the convex side of said dial being adjacent said transparent member, said dial having a line of flight marked thereon, the right hand side of said dial being coloured blue, the left hand side of said dial being coloured yellow, a galvanometer with associated armature being mounted in said casing, said armature having its centre of rotation vertically below the centre of said transparent member, a pointer secured to said armature and movable in front of said dial, said pointer extending to about the centre of said dial, a miniature aeroplane secured to the free end of said pointer, a second galvanometer mounted in said casing behind said transparent member, a second armature associated with said second galvanometer, said second armature having its axis of rotation at the centre of curvature of said dial, a second pointer secured to said second armature, a horizontal arm secured to said second pointer, said horizontal arm being movable in front of said dial and a miniature runway secured to said horizontal, the combined positions of the pointer with the miniature aircraft thereon and the miniature runway serving to indicate to a pilot his position relatively to a runway on which he is to land.

2. An airfield approach instrument according to claim 1, including a scale at the lower end of said transparent member relatively to which said first pointer moves, coloured panels at the sides of said dial along which said horizontal arm moves, the central area of each panel being green, the upper areas being red and the lower areas being yellow, said aeroplane having an opening therein, said opening being in such a position that when the first pointer is in a vertical position it is possible to see therethrough the point of connection between a reduced end on said miniature runway and said horizontal arm when the latter extends centrally across said dial, a counter balance being mounted on said second pointer for balancing the latter.

MARJORIE HENDRY CAMERON WELLS.

REFERENCES CITED

The following references are of record in the file of this patent:

UNITED STATES PATENTS

| Number | Name | Date |
|---|---|---|
| 640,753 | Cuntz | Jan. 9, 1900 |
| 1,272,396 | Dixon et al. | July 16, 1918 |
| 2,245,970 | Frantz | June 17, 1941 |
| 2,262,245 | Mosely et al. | Nov. 11, 1941 |
| 2,423,269 | Summers, Jr. | July 1, 1947 |
| 2,424,570 | Jenks | July 29, 1947 |